(12) United States Patent
Friedrich et al.

(10) Patent No.: US 8,064,563 B2
(45) Date of Patent: Nov. 22, 2011

(54) FIRST-WALL COMPONENT FOR A FUSION REACTOR

(75) Inventors: Thomas Friedrich, Halblech (DE);
Arno Plankensteiner, Reutte (AT);
Bertram Schedler, Reutte (AT);
Karlheinz Scheiber, Breitenwang (AT);
Hans-Dieter Friedle, Häselgehr (AT);
Thomas Huber, Breitenwang (AT);
Dietmar Schedle, Reutte (AT); Anton Zabernig, Reutte (AT)

(73) Assignee: The European Atomic Energy Community, represented by the European Commission, Brussels (BE)

( * ) Notice: Subject to any disclaimer, the term of this patent is extended or adjusted under 35 U.S.C. 154(b) by 0 days.

(21) Appl. No.: 11/859,993

(22) Filed: Sep. 24, 2007

(65) Prior Publication Data

US 2008/0032530 A1  Feb. 7, 2008

Related U.S. Application Data

(63) Continuation of application No. PCT/AT2006/000113, filed on Mar. 17, 2006.

(30) Foreign Application Priority Data

Mar. 22, 2005  (AT) .................. GM179/2005

(51) Int. Cl.
*G21B 1/00* (2006.01)
*G21B 1/13* (2006.01)
*H05H 1/22* (2006.01)
*H05H 1/12* (2006.01)

(52) U.S. Cl. .................. 376/136; 376/150; 376/100

(58) Field of Classification Search .................. 376/150, 376/136, 100
See application file for complete search history.

(56) References Cited

U.S. PATENT DOCUMENTS

| 1,912,912 | A | * | 6/1933 | Nygaard | ........................ 122/6 A |
| 5,012,860 | A | * | 5/1991 | Mukherjee | ........................ 165/47 |
| 5,023,043 | A | * | 6/1991 | Kotzlowski et al. | .......... 376/150 |
| 5,182,075 | A | | 1/1993 | Gotoh et al. | |
| 5,586,152 | A | * | 12/1996 | Ioki et al. | ...................... 376/150 |

(Continued)

FOREIGN PATENT DOCUMENTS

EP  0181385 B1  9/1988

(Continued)

OTHER PUBLICATIONS

Thermo-mechanical design and structural analysis of the first wall for ARIES-IIIm a 100 MWe D 3He power reactor, Sviatoslavsky, I.N. ;Blanchard, J.P.; Mogahed, E.A.; Fusion Engineering, 1991. Proceedings., 14th IEEE/NPSS SYmposium on Sep.30-Oct. 3, 1991 pp. 455-458 vol. 1.*

(Continued)

*Primary Examiner* — Rick Palabrica
*Assistant Examiner* — Erin M B Leach
(74) *Attorney, Agent, or Firm* — Laurence A. Greenberg; Werner H. Stemer; Ralph E. Locher

(57) ABSTRACT

A first-wall component for a fusion reactor contains at least one heat shield having a first region inclined toward the plasma and a second region lying opposite the first region and formed of a graphitic material. The heat shield has one or more slots that end in the first or second regions and are oriented generally in the direction of an axis of the cooling tube. The components suitably cope with the mechanical stresses resulting both from production and from thermal cycling.

16 Claims, 3 Drawing Sheets

U.S. PATENT DOCUMENTS

| | | | |
|---|---|---|---|
| 5,740,955 A | 4/1998 | Kneringer et al. | |
| 6,443,354 B1 * | 9/2002 | Plochl et al. | 228/178 |
| 7,128,980 B2 * | 10/2006 | Schedler et al. | 428/553 |
| 2004/0195296 A1 | 10/2004 | Schedler et al. | |

FOREIGN PATENT DOCUMENTS

| | | | |
|---|---|---|---|
| GB | 1089391 A | | 11/1967 |
| JP | 03264891 A | * | 11/1991 |
| JP | 2001004767 A | * | 1/2001 |
| RU | 2179340 C2 | | 5/2000 |

OTHER PUBLICATIONS

Development of Carbon Materials and Plasma Facing Components for ITER M. Merola, C.H. Wu and the EU ITER Participating Team EFDA CSU Garching, Boltzmannstr. 2, D-85748 Garching, Germany Physica Scripta. vol. T111, 152-156, 2004.*

Machine translation of JP 2001-004767.*

Austrian Search Report, dated Nov. 21, 2005 International Search Report, dated Aug. 17, 2006.

* cited by examiner

FIRST-WALL COMPONENT FOR A FUSION REACTOR

CROSS-REFERENCE TO RELATED APPLICATIONS

This is a continuation, under 35 U.S.C. §120, of copending international application No. PCT/AT2006/000113, filed Mar. 17, 2006, which designated the United States; this application also claims the priority, under 35 U.S.C. §119, of Austrian patent application GM 179/2005, filed Mar. 22, 2005; the prior applications are herewith incorporated by reference in their entirety.

BACKGROUND OF THE INVENTION

1. Field of the Invention:

The invention relates to a first-wall component of a fusion reactor. The first-wall component contains at least one heat shield with a closed or open lead-through formed of a graphitic material and a cooling tube through which a coolant flows and which is at least partially material-bonded to the heat shield and is formed of a material having a thermal conductivity>200 W/m·K.

A typical example of the use of first-wall components of this type is diverters and limiters that are exposed to the high thermal loads of more than 10 mW/m$^2$. First-wall components normally contain a heat shield and a heat-dissipating region. The material of the heat shield must be compatible with plasma, have high resistance with respect to physical and chemical sputtering, possess a high melting point/sublimation point and be as resistant as possible to thermal shock. In addition, they must also have high thermal conductivity, low neutron activatability and sufficient strength/fracture toughness, along with good availability and acceptable costs. In addition to refractory metals, such as, for example, tungsten, and graphitic materials (for example, fiber-reinforced graphite) best fulfill this diverse and sometimes contradictory requirement profile. Since the energy flows from the plasma act on these components over a lengthy period of time, first-wall components of this type are typically cooled actively. The heat discharge is assisted by heat sinks that contain, for example, copper or copper alloys and which are usually mechanically connected with the heat shield.

First-wall components may be implemented in a varying configuration. A customary design is in this context is what is known as a monobloc design. In the monobloc design, the first-wall component contains a heat shield with a concentric bore. The heat shield is connected to the cooling tube via this concentric bore.

First-wall components have to tolerate not only thermally induced, but also additionally occurring mechanical stresses. Such additional mechanical loads may be generated via electromagnetically induced currents that flow in the components and interact with the magnetic field of the surroundings. In this case, high-frequency acceleration forces may arise, which have to be transmitted by the heat shield, that is to say, for example, by the graphitic material. However, graphitic materials have low mechanical strength and fracture toughness. In addition, during use, neutron embrittlement occurs, thus resulting in a further increase in the sensitivity of these materials with respect to crack introduction. Fiber-reinforced graphite (CFC) is usually employed as the graphitic material. The fiber reinforcement is in this case disposed three-dimensionally and linearly. The architecture of the fibers gives the material different properties, depending on the orientation. CFC is usually reinforced in one orientation by Ex-pitch fibers that have both the highest strength and also thermal conductivity. The other two orientations are reinforced by Ex-PAN fibers, one direction typically only being needled.

Thus, whereas CFC has a linear material architecture, the heat shield/cooling tube connection geometry is circular. On account of the different coefficients of thermal expansion of the materials used, during the production process a stress build-up occurs which may lead to cracks in the CFC. These cracks can be detected, if at all, only by highly complicated methods because of the geometric conditions and the material combination used. This presents corresponding problems against the background of a nuclear environment for such components, above all also because cracks/peelings are seen as a possible trigger for a major incident. Despite complicated year-long development activity in the field of first-wall components, the components available hitherto do not optimally fulfill the requirement profile.

BRIEF SUMMARY OF THE INVENTION

It is accordingly an object of the invention to provide a first-wall component for a fusion reactor which overcomes the above-mentioned disadvantages of the prior art devices of this general type, which suitably satisfies the requirements resulting from mechanical stresses.

The first-wall component contains at least one heat shield formed of a graphitic material with a first face inclined toward the plasma and with a second face lying opposite the first face. The heat shield has one or more slots that end in the first or second face and, as seen in the direction of the axis of the cooling tube, run generally over a length of the heat shield. It is advantageous, further, that the maximum slot width in the region of the slot bottom does not overshoot D/2, where D is the outside diameter of the cooling tube. Tests, set out in more detail in the examples, have shown that the components according to the invention suitably cope with the mechanical stresses resulting both from production and from thermal cycling. The slot advantageously runs approximately perpendicularly with respect to the first or second face. The slot depth, in turn, is advantageously greater than half the distance between the first and second faces and the nearest surface of the cooling tube. A particularly favorable range for the slot depth x is $u/2 \leq x \leq 9u/10$, u being the spacing, measured in the vertical direction, between the first and second faces and the nearest cooling tube surface. The slot may, however, even extend as far as the cooling tube or as far as a ductile layer enveloping the cooling tube. In this case, the heat shield does not have a closed lead-through, but an open one. Since cooling tubes with a circular cross section are normally used, the lead-through also has a circular cross section.

The minimum slot width of 10 µm is obtained as a result of the cutting methods available for graphitic materials, such as the diamond saw method or wire cutting. The preferred maximum slot width is D/3. In order to avoid stress peaks in the slot bottom, it is advantageous if this has a radius which is in the region of 0.5×the slot width. It is advantageous, further, if the slot ends in the second face, since, during use, slight erosion occurs in the region of the slot on the face confronting the plasma. A further advantageous version is the single-slot variant, the slot being directed toward the cooling tube center point. The use of two or three slots, as also illustrated in detail in the examples, to a great extent also reduces the stresses occurring during production and thermal cycling. The combination of CFC for the heat shield with the slots according to the invention leads to a particularly beneficial combinational effect especially when the Ex-pitch fibers are oriented approximately perpendicularly with respect to the face A, the Ex-PAN fibers are oriented parallel to the axis of the cooling tube and the needled Ex-PAN fibers are oriented radially with respect to the cooling tube axis. For economic reasons and because of the high thermal conductivity, the use of copper alloys for the cooling tubes is to be preferred. Further, the stresses in the component may be reduced by the introduction of a very soft layer (hardness<200 HV) between the cooling tube and heat shield.

Other features which are considered as characteristic for the invention are set forth in the appended claims.

Although the invention is illustrated and described herein as embodied in a first-wall component for a fusion reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
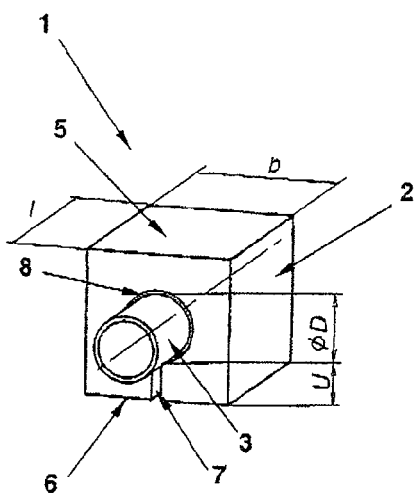
FIG. 1 is a diagrammatic, oblique view of a component according to the invention with a slot.
Figure 2:
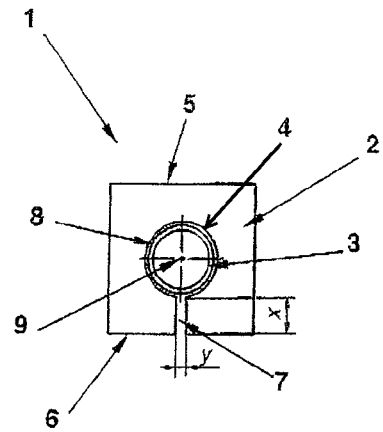
FIG. 2 is a diagrammatic, top plan view of the component according to FIG. 1.
Figure 3:
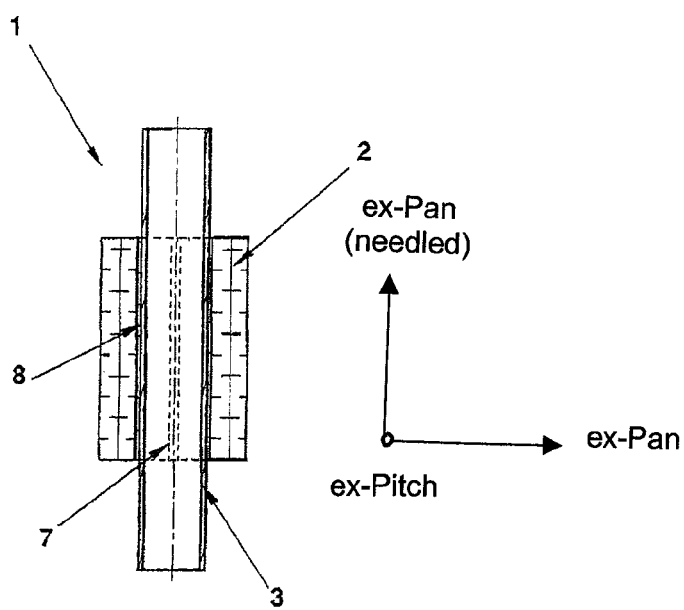
FIG. 3 is a diagrammatic, cross-sectional view of the component according to FIG. 1 and, further, the CFC fiber direction.

Referring now to the figures of the drawing in detail and first, particularly, to FIGS. 1-3 thereof, there is shown as a first example a first-wall component 1 produced as now described. Heat shields 2 in the form of monoblocs with a lead-through formed by a bore 4 are worked out from fiber-reinforced graphite blocks (CFC), the high-strength Ex-pitch fibers lie in the direction of the highest thermal conductivity, the Ex-PAN fibers lie parallel to the axis of the cooling tube and the needled Ex-PAN fibers lie in the cooling tube axis. The dimensions of the individual monoblocs are 40 mm (Ex-pitch), 30 mm (Ex-PAN) and 20 mm (Ex-PAN needled). The diameter of the bore 4 is 14 mm and is located at a center of symmetry 9 of the heat shield 2. Before further processing, the wall of the bore 4 is structured by a laser, with the result that a multiplicity of conical holes are introduced in the CFC. Such holes typically have a depth of about 0.5 mm and an opening on the surface of 0.2-0.3 mm. The spacing was selected such that the surface of the bore wall is maximized. On a side 6 facing away from the plasma, a slot 7 with a slot width of 0.3 mm is introduced in the heat shield 2 by wire cutting. The slot 7 lay in an axis of symmetry of the heat shield 2 and runs from the surface 6 facing away from the plasma into the centrally lying bore 4. Subsequently, the bore 4 is filled via a casting process with oxygen-free copper in the presence of a carbide former, such as, for example, titanium. The process was conducted such that the previously introduced 0.3 mm wide slot 7 in the heat shield 2 is not wetted by copper during the casting process. After the casting process, the flanks of the slot 7 have a smaller spacing, as compared with the processing state. This fact showed that the stresses occurring were converted into deformation. This lead to a stress reduction, without the functioning capacity and the beneficial properties of the component 1 being lost due to this measure. A visual and metallographic assessment of the CFC/Cu interfaces in the backed-up state gave no indications as to possible delaminations in the CFC/copper composite.

The copper-filled bore 4 thus obtained was subsequently subjected to mechanical machining, so that a bore with a diameter of 12.5 mm and therefore an about 0.5-1.0 mm thick copper layer 8 remained on the CFC.

Three heat shields 2 thus obtained, with a slot 7, were slipped onto a cooling tube 3 formed of a CuCrZr alloy with a diameter of 12 mm and introduced into a metal can. After the welding of the can, the latter was evacuated and the suction-extraction connection piece was thereafter sealed, vacuum-tight. The components canned in this way were then subjected to an HIP process at 550° C. and 1000 bar. During this process, a material bonding occurred between the CuCrZr tube 3 and the copper layer in the bore 4 of the CFC monobloc 2. In addition, a curing of the CuCrZr material also took place, with the result that excellent mechanical properties in the cooling tube 3 could be achieved. After the connection process, the can was removed from the first-wall component 1 thus obtained. A visual assessment give no indications as to any faults, such as, for example, delaminations. An ultrasound test additionally carried out with an inner tube probe showed a perfect interface.

In conclusion, the first-wall component 1 was subjected to the plasma of a VPS plant. The component 1 was in this case connected to the cooling water system present in the plant and was held by the gripping arm of a robot installed in the plant. A heat flow in the range of 10-15 MW/m$^2$ was determined by analyzing a flow velocity, the temperature rise of the cooling medium and the surface 5 acted upon by the plasma. Overall, the component 1 was cycled by movement through the plasma about 100 times. During movement, the component 1 was in each case held in the plasma until the temperature of the cooling water did not heat up any further. After this test, the component 1 was tested to destruction. It was shown that a crack could not be detected in any of the heat shields 2 investigated, this being a fact that could not yet be achieved in components which are not according to the invention.

Second Example

The first-wall component 1 was manufactured according to the first example. In the subsequent test, the slotted surface was exposed to the plasma. The test furnished similar results to those in the first example 1, the difference being that slight erosion took place in the region of the slot 7.

Third Example

The first-wall component 1 according to FIGS. 1 to 3 is produced as now described.

The heat shields 2 in the form of monoblocs with the bore 4 are worked out from fiber-reinforced graphite blocks (CFC), once again the high-strength Ex-pitch fibers lie in the direction of the highest thermal conductivity, the Ex-PAN fibers lie parallel to the axis of the cooling tube and the needled Ex-PAN fibers lie in the cooling tube axis. The dimensions of the individual monoblocs corresponded to those of the first example. The introduction of the bore and laser structuring also took place, as described in the first example. On the side 6 facing away from the plasma, the slot 7 with a slot width of 0.3 mm is introduced in the heat shield 2 by wire cutting. The slot 7 lies on the axis of symmetry of the heat shield 2 and penetrated the bore 4. The bore 4 was subsequently filled in a similar way to the first example with oxygen-free copper, subjected to mechanical machining and connected to a cooling tube 3 formed of a CuCrZr alloy by soldering, the soldering temperature lying in the region of the solution heat treatment temperature (970° C.) of the CuCrZr. The cooling from the soldering temperature to below 400° C. took place with a cooling rate>1 K/sec, with the result that optimal strength values could be established during subsequent age hardening at 475° C./3 h. The composites thus produced also showed no cracks after thermal cycling according to the first example.

Fourth Example

Figure 4:
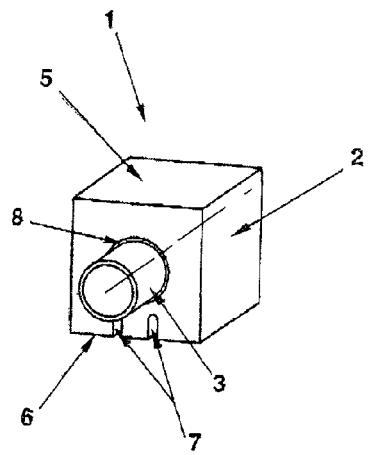
FIG. 4 is a diagrammatic, oblique view of a component according to the invention with two slots.
Figure 5:
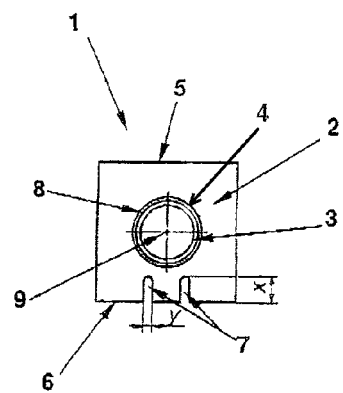
FIG. 5 is a diagrammatic, top plan view of the component according to FIG. 4.
Figure 6:
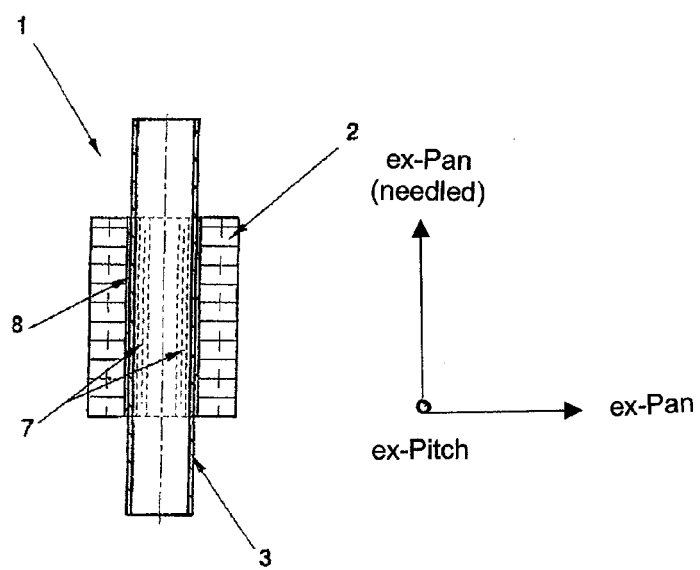
FIG. 6 is a diagrammatic, cross-sectional view of the component according to FIG. 4 and, further, the CFC fiber direction.

The first-wall component 1 according to FIGS. 4 to 6 is produced as now described.

The heat shields 2 in the form of monoblocs with the bore 4 are worked out from fiber-reinforced graphite blocks (CFC), once again the high-strength Ex-pitch fibers lie in the direction of the highest thermal conductivity, the Ex-PAN fibers lie parallel to the axis of the cooling tube and the needled Ex-PAN fibers lie in the cooling tube axis. The dimensions of the individual monoblocs correspond to those of the first example. The introduction of the bore and the laser structuring also took place, as described in the first example. On the side 6 facing away from the plasma, two slots 7 with a slot width of 0.3 mm are introduced in the heat shield 2 by wire cutting. The slots 7 lay mirror-symmetrically to the axis of symmetry of the heat shield 2. The slots 7 each had a depth x of 0.8 u, u being the smallest spacing between the heat shield surface 5 and the cooling tube 3. The bore 4 is subsequently filled in a similar way to the first example with oxygen-free copper, subjected to mechanical machining and material-bonded to a cooling tube 3 consisting of a CuCrZr alloy by soldering according to the sequence in the third example. The composites thus produced also showed no cracks after thermal cycling according to the first example.

Fifth Example

Figure 7:
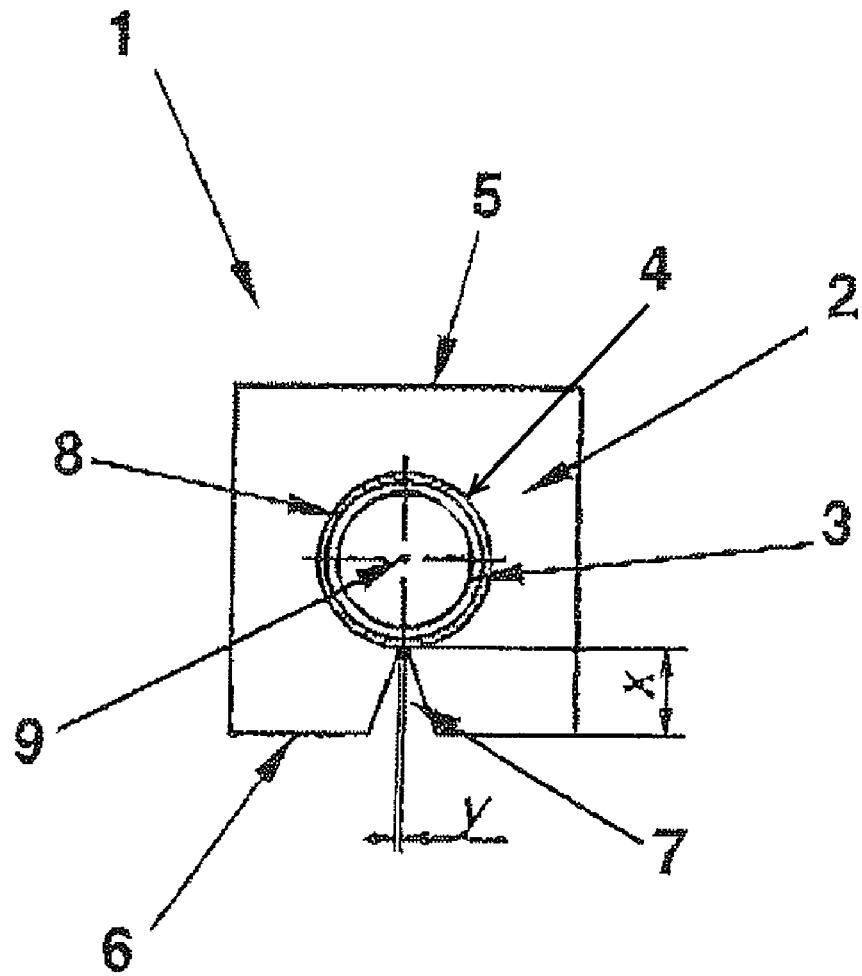
FIG. 7 is a diagrammatic, top plan view of a component according to the invention with a V-shaped slot.

The first-wall component 1 according to FIG. 7 is produced as now described. Monoblocs are produced according to the first example. On the side 6 facing away from the plasma, a V-shaped slot 7, as illustrated in FIG. 7, is introduced by wire cutting. The further manufacturing steps took place, as described in the first example. The composites thus produced also showed no cracks after thermal cycling according to the first example.

The invention claimed is:

1. A first-wall component for a fusion reactor, the first-wall component comprising:
   at least one heat shield formed from a graphitic material, said heat shield having a lead-through formed therein and selected from the group consisting of a closed lead-through and an open lead-through, a first face configured to face a plasma, a second face disposed opposite said first face, a length, and a width, said heat shield having at least one slot formed therein and running generally over said length and ending in one of the first and second faces; and
   a cooling tube for conducting a coolant flow and having an outside diameter D, said cooling tube at least partially material-bonded to said heat shield and formed from a material having a thermal conductivity >200 W/m·K;
   said lead-through surrounding said cooling tube, and said lead-through extending along all of said length of said heat shield;
   wherein said heat shield is a monobloc, and said slot extends parallel to said cooling tube.

2. The first-wall component according to claim 1, wherein said slot has a slot bottom and a maximum slot width y at said slot bottom of D/2.

3. The first-wall component according to claim 1, wherein said slot ending in a respective one of said first and second faces runs generally perpendicularly with respect to said respective face.

4. The first-wall component according to claim 1, wherein said slot has a depth x, with u/2 ≦x ≦u, where u is a smallest spacing between an outer surface of said heat shield and said cooling tube, said outer surface selected from the group consisting of the first face and the second face.

5. The first-wall component according to claim 4, wherein said slot extends as far as said cooling tube.

6. The first-wall component according to claim 2, wherein said maximum slot width y at said slot bottom is in the range 10 μm<y<D/3.

7. The first-wall component according to claim 2, wherein said slot bottom has a radius.

8. The first-wall component according to claim 1, wherein said slot ends in said second face.

9. The first-wall component according to claim 1, wherein said heat shield has one said slot, said slot being oriented in a direction of a center point of said cooling tube.

10. The first-wall component according to claim 1, wherein said slot is one of two slots formed in said heat shield, said slots are disposed mirror-symmetrically to a plane of symmetry.

11. The first-wall component according to claim 1, wherein said graphite material forming said heat shield is a fiber-reinforced graphite.

12. The first-wall component according to claim 11, wherein:
   said fiber-reinforced graphite has fibers; and
   said fibers with a highest strength and said slot have an orientation deviating by at most 20°.

13. The first-wall component according to claim 11, wherein said fiber-reinforced graphite has Ex-pitch fibers oriented approximately perpendicularly with respect to said first face, Ex-PAN fibers oriented parallel to an axis of said cooling tube and needled Ex-PAN fibers oriented radially with respect to said axis of said cooling tube.

14. The first-wall component according to claim 1, wherein said cooling tube contains a copper alloy.

15. The first-wall component according to claim 1, further comprising a layer formed of a material selected from the group consisting of pure copper and a copper alloy with a strength <200 HV is disposed between said cooling tube and said heat shield.

16. The first-wall component according to claim 1, wherein the thermal conductivity of the material forming said cooling tube is greater than 200 W/m·K at 20 degrees Celsius.

* * * * *